United States Patent
Miyata

(10) Patent No.: US 7,997,740 B2
(45) Date of Patent: Aug. 16, 2011

(54) INTEGRATOR UNIT

(75) Inventor: Yasuyuki Miyata, Saitama (JP)

(73) Assignee: Fujinon Corporation, Saitama (JP)

( * ) Notice: Subject to any disclaimer, the term of this patent is extended or adjusted under 35 U.S.C. 154(b) by 514 days.

(21) Appl. No.: 12/054,405

(22) Filed: Mar. 25, 2008

(65) Prior Publication Data

US 2008/0240668 A1   Oct. 2, 2008

(30) Foreign Application Priority Data

Mar. 29, 2007  (JP) ................. 2007-087024

(51) Int. Cl.
  *G03B 21/14*  (2006.01)
  *G03B 21/22*  (2006.01)
  *G02B 6/00*  (2006.01)

(52) U.S. Cl. .................. 353/119; 385/133; 362/581

(58) Field of Classification Search .................. 353/119, 353/122, 98, 99; 385/133, 901; 362/581
See application file for complete search history.

(56) References Cited

U.S. PATENT DOCUMENTS 7,182,471 B2   2/2007 Yoshikawa
2006/0227304 A1* 10/2006 Kang et al. .................... 353/119

FOREIGN PATENT DOCUMENTS

JP   2004-085780   3/2004
JP   2004-354925   12/2004

\* cited by examiner

*Primary Examiner* — William C Dowling
*Assistant Examiner* — Ryan Howard
(74) *Attorney, Agent, or Firm* — Birch, Stewart, Kolasch & Birch, LLP

(57) ABSTRACT

An integrator unit for integrating an incoming light beam for a uniform distribution of illumination comprises an inner cylinder fixedly equipped with a rod integrator, an outer cylinder in which the inner cylinder is coaxially received for axial movement and axial adjustment members which comprises a circumferential groove spatially squared to a center axis of the inner cylinder and a radial access bore formed in the outer cylinder. A round shaped position adjustment tool has an end pin on a round end face thereof in a position off center from an axis of rotation of the position adjusting tool. The position adjusting tool is inserted in the radial access bore to put the end pin in the circumferential groove and turned in the radial access bore so as thereby to move the inner cylinder axially back and forth.

6 Claims, 6 Drawing Sheets

INTEGRATOR UNIT

BACKGROUND OF THE INVENTION

1. Field of the Invention

The present invention relates to an integrator unit for achieving a uniform distribution of illumination by a light beam from an illumination light source.

2. Description of Related Art

There have been known digital micro mirror devices (DMDs), one of optical modulation devices, incorporated into projectors for projecting an image on a screen. In a digital light processing (DLP) type of projector with such a DMD installed therein, a light beam from a light source impinges the DMD through an illumination lens system. The DMD modulates a light beam incident upon a mirror surface (which is called a light modulation area or a pixel area) thereof according to video signals or picture information and then provide image forming light for projecting an image on the screen through a projection lens system.

The DLP projector is typically provided with a rod integrator or a relay lens system disposed in an illumination path between the light source and the DMD. Common examples of the rod integrator include such a rectangular hollow pipe made up of glass plates with inside surfaces coated with reflective coatings, respectively, as is described in Japanese Unexamined Patent Publication No. 2004-354925 and a long rectangular prism. A light beam incident upon the rod integrator is uniformized in illumination distribution by repeated total reflection by the internal reflective surfaces and then impinges the DMD through a relay lens system. An illuminated area of the DMD is typically defined by an area on which an optical image at an exit surface of the rod integrator is focused by the relay lens system between the rod integrator and the DMD.

It is desirable for an image projected on a screen to be as bright as possible. Therefore, it is required that a light beam from the light source reaches the whole light modulation area of the DMD at a high efficiency. With the aim of filling this requirement, a projector provided with a rod integrator adjustable in position is described in, for example, Japanese Unexamined Patent Publication No. 2004-354925. The rod integrator is fixedly attached with an adhesive after position adjustment.

The light beam incident upon the DMD must be uniformized in illumination distribution and sufficiently bright as well in order for the projector to project a quality image on a screen. On that account, it is typical to use as the light source high accuracy discharge lamps such as a very high pressure mercury lamp, a metal halide lamp, a xenon lamp and suchlike. What is important is that the light beam covers the whole light modulation area of the DMD. If the light beam has an illumination field beyond the whole modulation area of the DMD, the light beam is wasted. On the other hand, if the light beam has an illumination field too small to cover the modulation area of the DMD 26, a projected image includes peripheral omissions.

In the case of a digital light processing optical system, it is impossible to determine image brightness unless an image is projected through the digital processing optical system installed in an actual projector. In such conventional position adjustable rod integrators as described in Japanese Unexamined Patent Publication No. 2004-354925, because the rod integrator is fixedly and hermetically assembled to an integrator unit before installation thereof into a projector, it is impossible to readjust the rod integrator unless the integrator unit is dissembled if it is found that the illumination field of the rod integrator is too wide or too narrow.

SUMMARY OF THE INVENTION

It is therefore an object of the present invention to provide an integrator unit for use with a projector which enables a rod integrator to be adjusted in axial position after having assembled the integrator unit into a projection unit to be installed in a projector.

The foregoing objects of the present invention are accomplished by an integrator unfit comprising a rod integrator, an inner cylinder for fixedly holding the rod integrator, and an outer cylinder for receiving the inner cylinder coaxially therein for axial slide movement. The integrator unit further comprises axial position adjusting means which comprises engaging means provided on the inner cylinder such as a circumferential groove formed in a cylinder shell wall of the inner cylinder which is spatially squared with a center axis of the inner cylinder and a radial access bore formed in a cylinder shell wall of the outer cylinder in which an axial position adjusting tool having engaging means such as an end pin or projection in a position off center from an axis of rotation of the axial position adjusting tool is fitted for rotation. When the axial position adjusting tool is fitted in the radial access bore with the end pin received in the circumferential slot and turned therein, the inner cylinder is axially slid back and forth though engagement between the circumferential groove and the end pin so as thereby to put the rod integrator in a desired axial position.

The integrator unit may further comprises axial slide guide means for allowing axial slide movement of the inner cylinder in the outer cylinder and preventing rotation of the inner cylinder relative to the outer cylinder during the axial position adjustment. The axial slide guide means comprises an axial slot formed in the inner cylinder and a radial projection projecting from the outer cylinder or vise versa.

According to the integrator unit, it is realized to perform axial position adjustment of the rod integrator installed in a projector without disassembling the integrator unit so that the rod integrator provides a uniform distribution of illumination by a light beam from an illumination light source. Furthermore, the integrator unit having the axial slide guide means prevents the rod integrator from loosing coaxiality with the outer cylinder during axial position adjustment

BRIEF DESCRIPTION OF THE DRAWINGS

The foregoing and other objects and features of the present invention will be clearly understood from the following detailed description when reading with reference to the accompanying drawings where, on the graphic representation of an optical thickness distribution, the optical thickness (n×d) is represented by the scale reading multiplied by a center wavelength (λc) and in which.

DETAILED DESCRIPTION OF THE PREFERRED EMBODIMENTS

Figure 1:
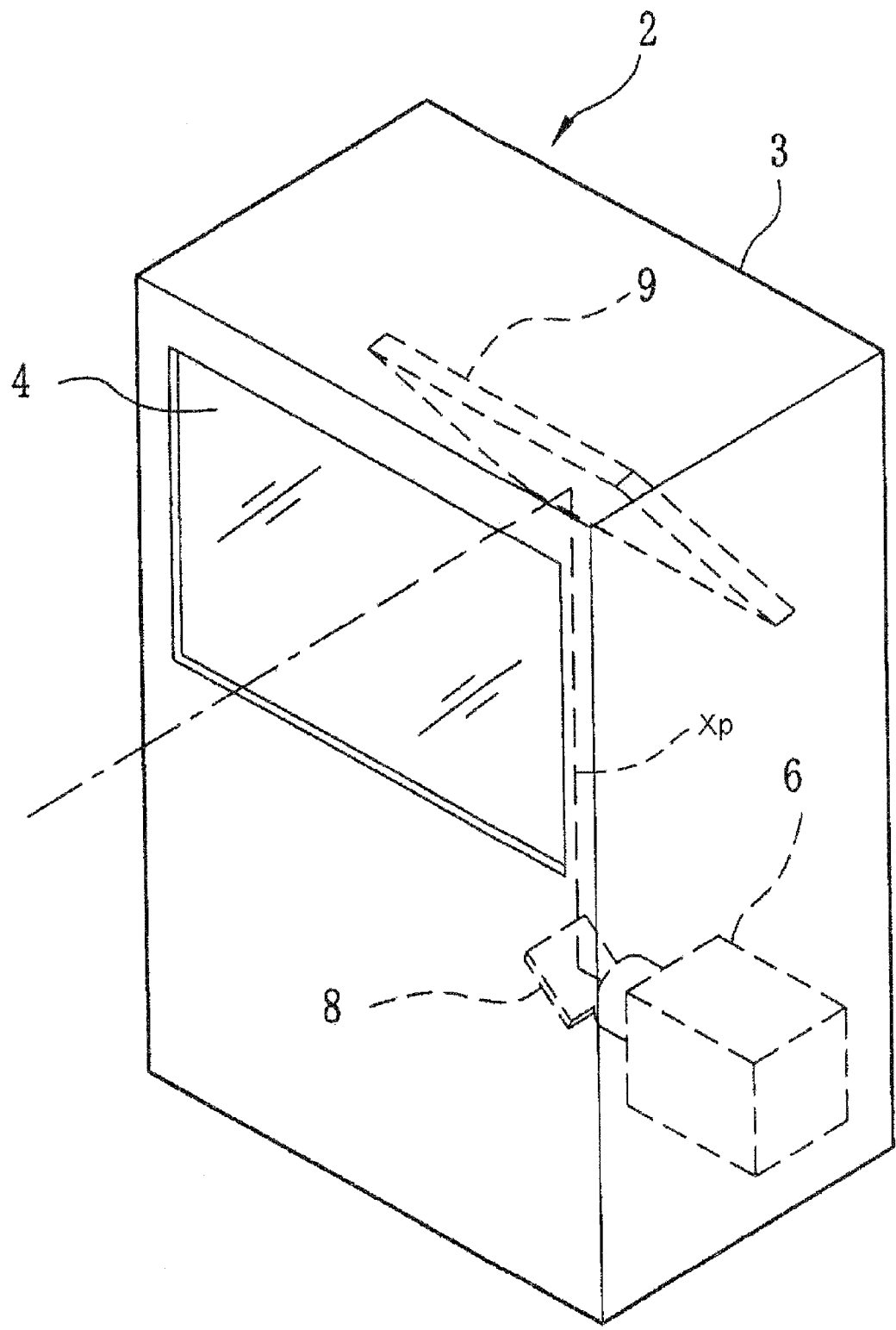
FIG. 1 is a schematic perspective view of a projector equipped with an integrator unit of the present invention.

Referring to the accompanying drawings in detail and, in particular, to FIG. 1 schematically showing a rear projector 2 having a box-shaped housing 3 with a rear projection type of diffuse transmission screen 4 fitted in a front wall of the housing 3. An image projected on the screen from the rear is viewed from the front. There are disposed in the housing 3 a projection unit 6 at the bottom and mirrors 8 and 9 in an optical axis Xp of the projection unit 6. An optical image provided by the projection unit 6 is reflected by the mirror 8 and the mirror 9 and then projected onto the screen 4 from the rear. This projector is provided with a tuning circuit for sorting frequencies of TV signals and an audio reproduction circuit and, therefore available as a large-screen television.

Figure 2:
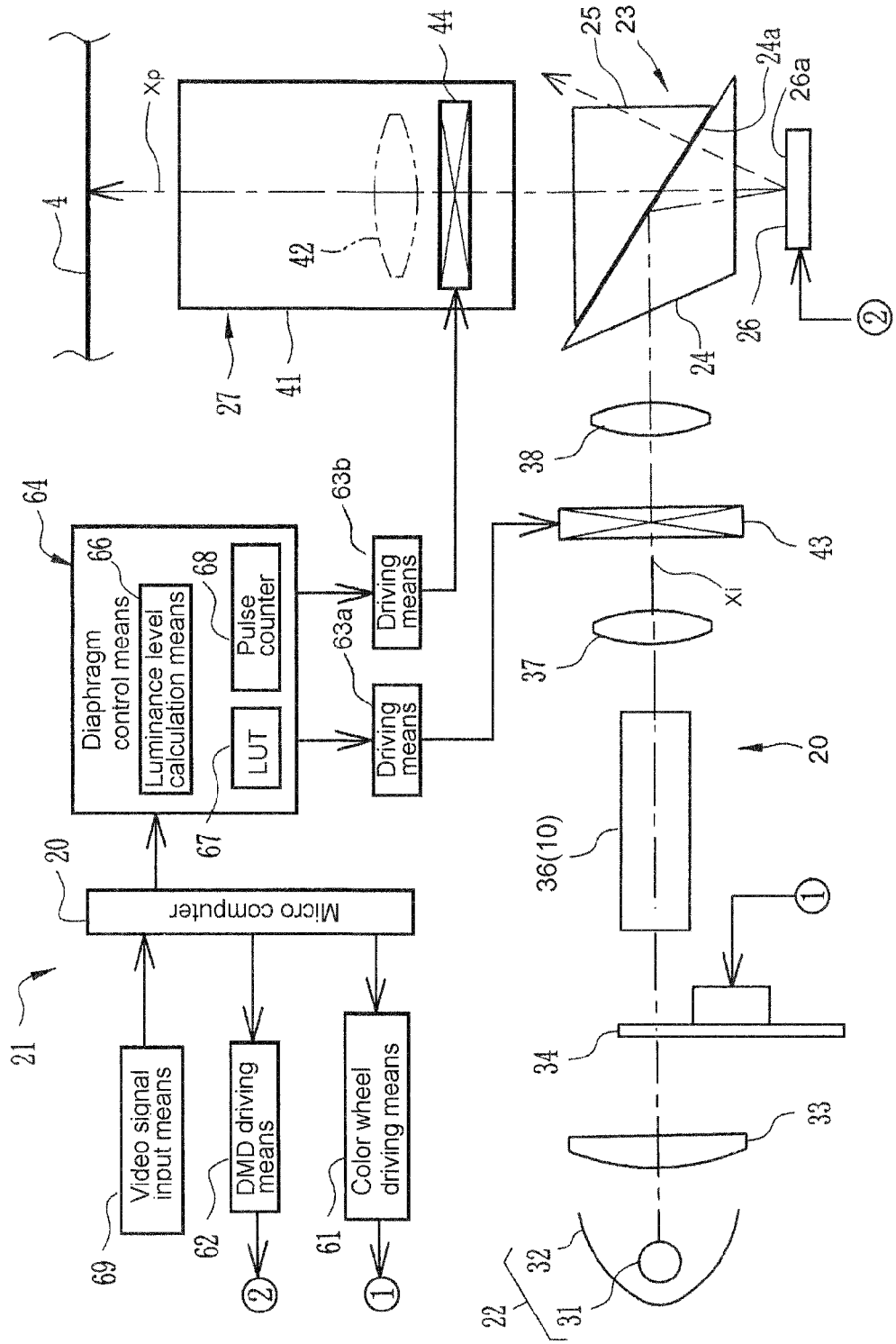
FIG. 2 is an illustration showing, partially in block, an integrator unit according to a preferred embodiment of the present invention.

Referring to FIG. 2 showing the projection unit 6 partly in block diagram, the projection unit 6, which is has a single MDM capable of producing three primary color images, comprises an illumination optical system 20, a projection optical system 27 arranged coaxially with the illumination optical system, and a controller 21. More specifically, the illumination optical system 20 comprises a light source unit 22, a color wheel 34, a rod integrator 36, a variable diaphragm 43 and a total reflection prism assembly 23. In the illumination light path, there are disposed a condenser lens 33 between the light source unit 22 and the color wheel 34 equipped with drive means 61, a relay lens 37 between the rod integrator 36 and the variable diaphragm 43, and a relay lens 38 between the variable diaphragm 43 and the total reflection prism assembly 23. The light source unit 22 comprises a lamp 31 and a reflector 32 for reflecting a light beam from the lamp 31 toward the total reflection prism assembly 23 through the rod integrator 36. The lamp 31 is known in various types and may be of any type of white light source such as a xenon lamp and a mercury lamp. The color wheel 34, which is driven by the controller 21 separates a light beam into three primary color light beams, namely red (R), green (G) and blue (B), in time-sharing as is well known, comprises a round disk rotatable about an axis of rotation and R, G and B transmission filters arranged on the rotating disk and equidistant from the axis of rotation. When the color wheel 34 rotates, the R, G and B selective transparency filters intersect an optical axis Xi of the illumination optical system 20 in order, so as thereby to separate the light beam into B, G and R light beams in time-shearing. The B, G and R light beams thus separated travel passing through the rod integrator 36 and the variable diaphragm 43 in order. The rod integrator 36 provides a uniform distribution of illumination on a mirror surface of the DMD from the periphery to the center by homogenizing luminous flux densities of the B, G and R light beams. The rod integrator 36 is known in various forms and may take any form well known in the art such as an elongated rectangular glass prism. Light beams entering the rod integrator 36 repeats internal total reflection and are mixed, so that the light beams coming out from the rod integrator 36 is uniform in illumination. The relay lenses 37 and 38 relay the light beam from the rod integrator 36 to the total reflection prism assembly 23. The variable diaphragm 43 is operated by the controller to vary an amount of light for variation of an image projected on the screen.

The total reflection prism assembly 23 is made up by two triangular prisms, specifically an obtuse-angled triangular prism 24 and a right-angled triangular prism 25, having the same refractive index which are bonded together with an air gap between the opposing surfaces. The triangular prism 24 is positioned so that a light beam entering along the optical axis Xi impinges an internal reflection surface 24a at an angle greater than a critical angle and is totally reflected by internal reflection surface 24a. The reflected light beam from the triangular prism 24 travels toward a DMD 26 forming a part of the projection optical system 27.

The projection optical system 27 comprises a projection lens unit 41 and the DMD 26 separately provided from the projection lens unit 41. The projection lens unit 41 includes a projection lens system 42 (schematically shown by a single lens element for simplicity) and a variable diaphragm 44. The variable diaphragm 44 is identical in mechanical structure and function and is, however, smaller in full aperture size than the variable diaphragm 43. The DMD 26 has a mirror surface 26a intersecting with the optical axis Xp of the projection unit 6 at a right angle. The mirror surface 26a comprises a number of micro mirrors as pixels in the form of matrix arrangement. As is well known in the art, the DMD 26 is driven according to video signals by the controller 21 to cause changes in angle of the individual micro mirrors independently according to video signals. Thus, the DMD 26 causes an angle of direction of a light beam incident upon the individual micro mirror. In this manner, the DMD 26 modulates incoming light beams according to the video signals and generates an optical image. Light beams from the DMD 26 pass through the prism assembly 23 and travel towards the projection optical system 27. Further, the individual micro mirror is put in an operative position to maintain a light beam within an projection light path when an image is required to be bright on the screen 4 and, on the other hand, in an inoperative position to direct a light beam out of the projection light path when an image is required to be dark on the screen 4.

The projection lens system 42 is operated by the controller 21 to focus and/or zoom an optical image generated by the DMD 26 on the screen 4. The variable diaphragm 44 is operated by the controller to vary an amount of light for variation of an image projected on the screen.

The controller 21 performs overall control of the projection unit 6 according to video signals. Specifically, the controller 21 comprises a microcomputer 20, video signal input means 69, DMD driving means 62, color wheel driving means 61, diaphragm control means 64 and diaphragm driving means 63a and 63b. Video signals such as composite signals and component signals are inputted to the microcomputer 20 from a picture signal generator (not shown) through input terminals and a tuner circuit of the video signal input means 69. The color wheel 34 is driven by signals including a start timing control signal and a rotational speed control signal provided by the microcomputer 20 through the color wheel driving means 61. The DMD 26 is driven by video signals inputted to the microcomputer 20 through the DMD driving means 62. The diaphragm driving means 63a and 63b, which are the same in structure as each other and have has pulse motors or DC motors, respectively, drive the variable diaphragms 43 and 44, respectively.

The diaphragm control means 64 controls the variable diaphragm 43 and the variable diaphragm 43 through the diaphragm driving means 63a and 63b, respectively. The diaphragm control means 64 comprises brightness level calculation means 66, a look-up table memory 67 and a pulse counter 68. The brightness level calculation means 66 calculates a brightness level of each image frame according to incoming video signals into the microcomputer 20. The brightness level can be calculated by, for example, striking an average brightness of pixels forming the frame. That is, an image frame abounding in white areas or parts has a higher brightness level and, on the other hand, an image frame abounding in dark areas or parts has a lower brightness level. The look-up table memory 67 has a prestored look-up table describing aperture sizes to which the variable diaphragms 43 and 44 are closed down from the full aperture according to differences in brightness level. The variable diaphragms 43 and 44 are adapted to close down at a changing rate of aperture size for one level down of brightness which gradually increases as the brightness level comes down. This is because, it is much better to increase the amount of light for an image at a higher brightness level for that highkeyed areas such as white areas of the image outshine all the remaining areas when laying weight on brightness. On the contrary, it is much better to decrease the amount of light for an image at a lower brightness level for that dark areas of the image are sharp when turning down image brightness.

Figure 3:
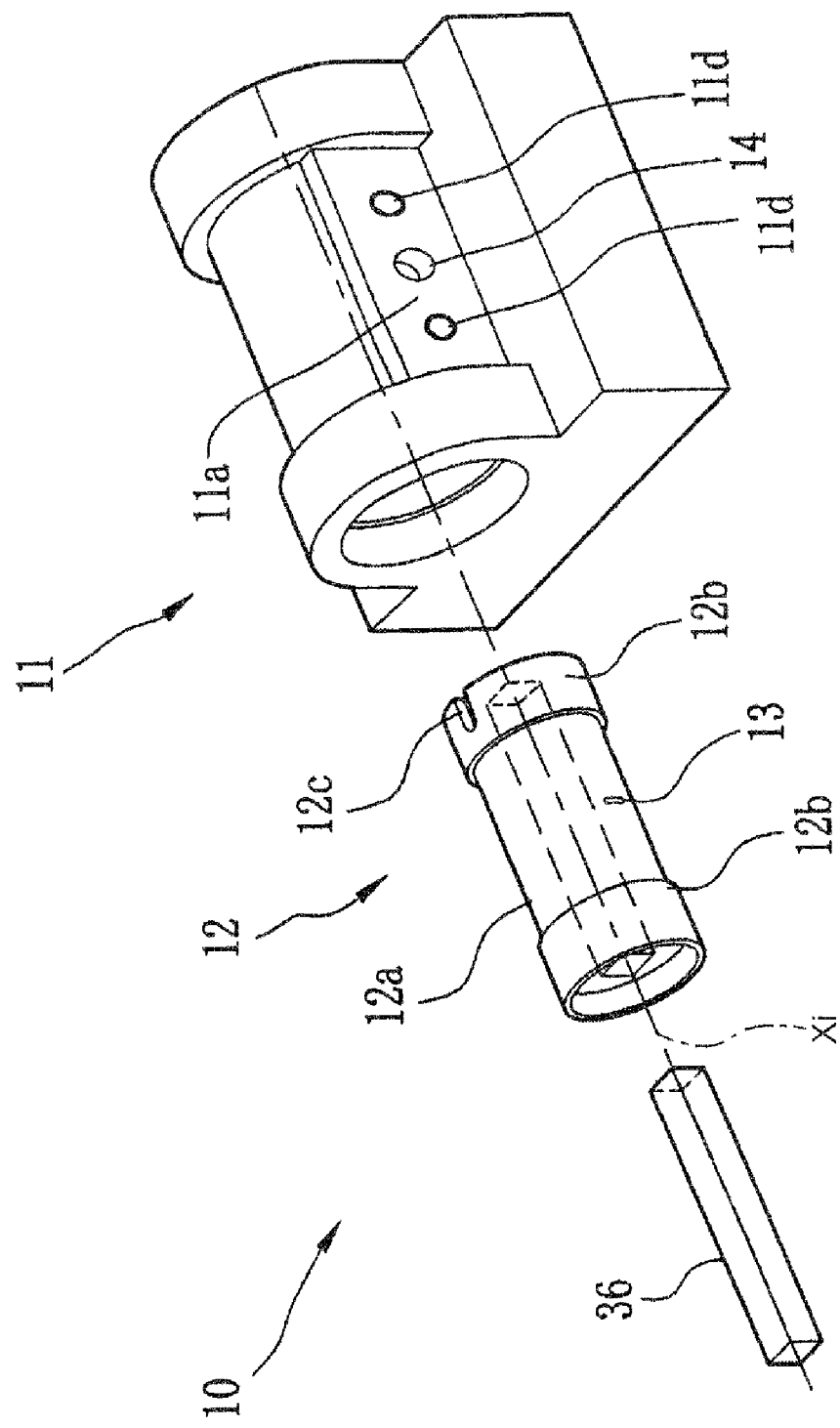
FIG. 3 is an exploded perspective view of the integrator unit.
Figure 4:
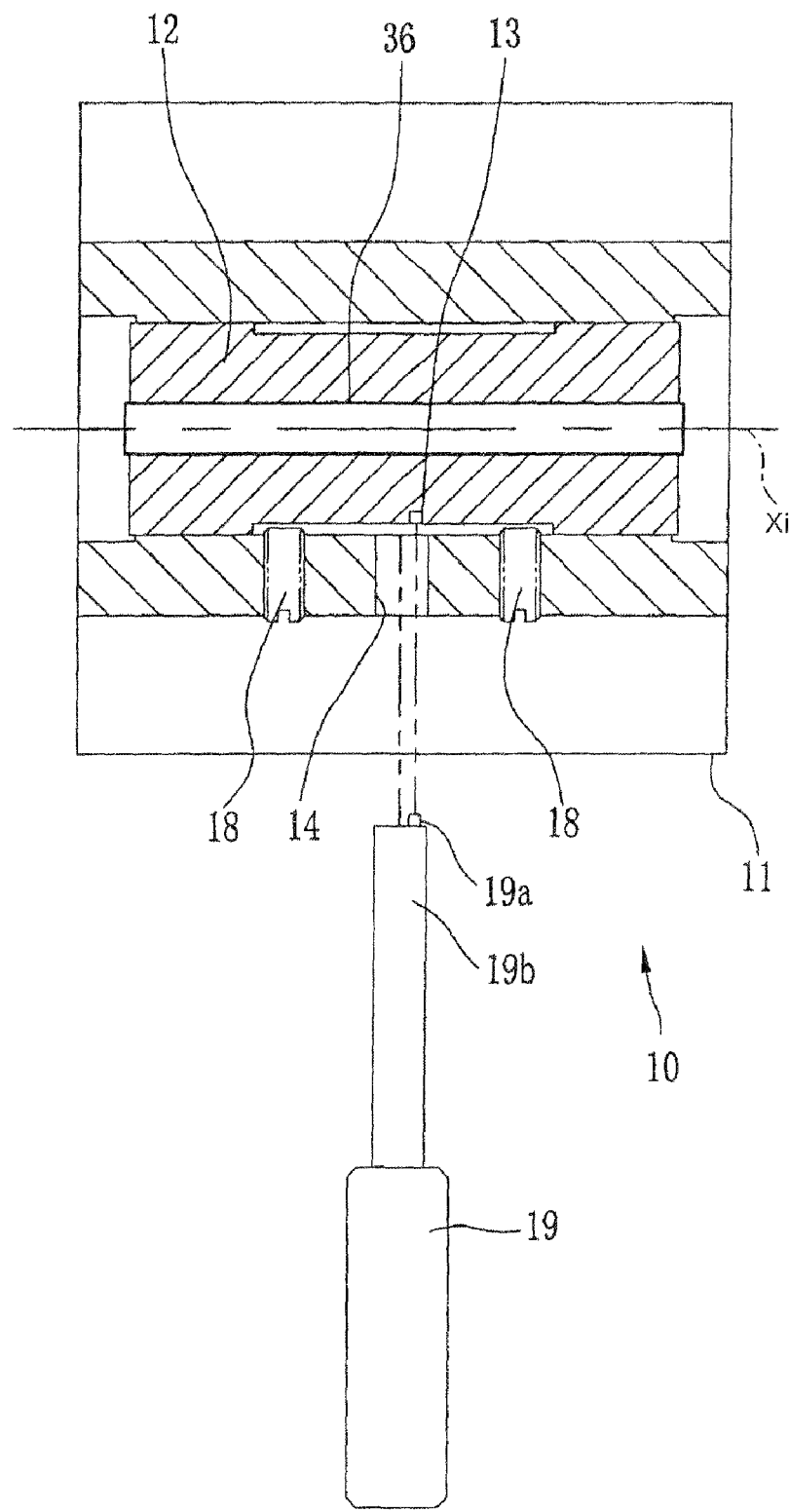
FIG. 4 is a longitudinal sectional view of the integrator unit for showing axial position adjusting means.

FIGS. 3 and 4 show an integrator unit 10 in which the rod integrator 36 is incorporated. The rod integrator 36 is known as such in various forms such as a hollow rod type and a solid rod type and may take any form well known in the art. The integrator unit 10 comprises an outer cylinder 11, an inner cylinder 12 movably received in the outer cylinder 11, and the rod integrator 36 fixedly received in the inner cylinder 12. The inner cylinder 12, which is formed as an integral structural element made of a light shielding material, comprises an inner cylinder shell 12a and front and rear guide bushes 12b at opposite ends of the inner cylinder shell 12a, respectively. The inner cylinder shell 12a, which is smaller in outer diameter than the guide bushes 12b, has a circumferential groove 13 for receiving a decentered end pin 19a of a position adjusting tool 19 (see FIG. 5). The circumferential groove 13 is approximately squared spatially with a center axis of the cylinder bore. The rear guide bush 12b has an open-ended axial guide slot 12c extending in an axial direction. The inner cylinder 12 is snugly fitted for axial slide movement in the outer cylinder 11 through the front and rear guide bushes 12b. The outer cylinder 11 has a flattened surface 11a formed by cutting off portion of the outer cylinder wall archwise in which screw bores 11d and a radial access bore 14 disposed between the screw bores 11d are formed in axial alignment with one another. As will be described later, the circumferential groove 13 and the radial access bore 14 form parts of axial position adjusting means which cooperates with the end pin 19a of the position adjusting tool 19 for axial position adjustment of the inner cylinder 12. The guide bore 14 allows access of the position adjusting tool 19 to the circumferential groove 13 of the inner cylinder 12 for position adjustment. Further, the outer cylinder 11 is provided with a guide pin 11c (see FIG. 6) radially-inwardly projecting in the cylinder bore. The axial and circumferential relative positions between the axial guide slot 12c and the circumferential groove 13 are coincident with those between the guide pin 11c and the guide bore 14 of the outer cylinder 11.

Figure 5:
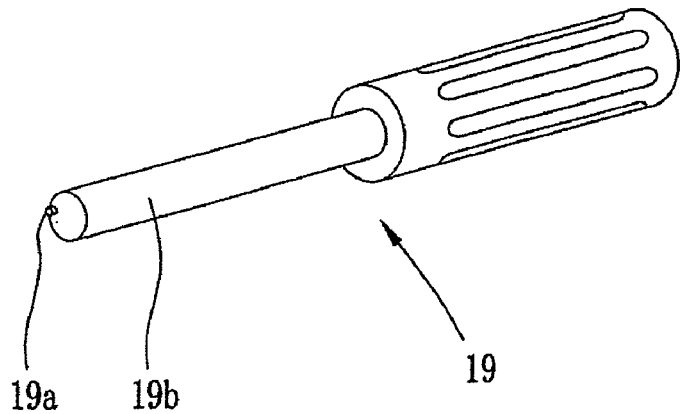
FIG. 5 is a perspective outside view of an axial position adjusting tool.

Referring to FIG. 5, the position adjusting tool 19 has a round shank 19b with the end pin 19a secured to the end face of the round shank 19b in a position decentered from the axis of rotation of the round shank 19b (which is hereinafter referred to an off center position). The round shank 19b has an outer diameter adjusted to an inner diameter of the guide bore 14.

Figure 6:
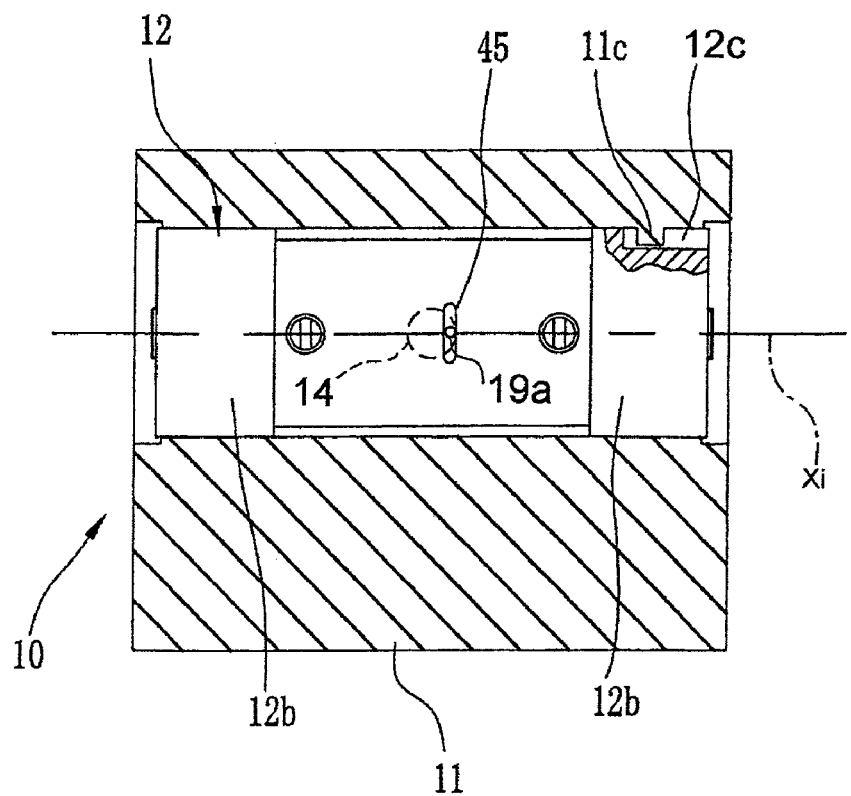
FIG. 6 is a longitudinal sectional view of the integrator unit for showing an internal structure thereof and FIGS. 7A to 7C are illustrations showing axial position adjusting operation.

Referring to FIGS. 4 and 6, the inner cylinder 12 with the rod integrator 36 fixedly received therein is installed into the cylinder bore of the outer cylinder 11 until the rear guide bush 12b abuts the guide pin 11c and then turned from side to side in circumferential opposite directions so as to bring the guide pin 11c into engagement with the guide slot 12c. When the guide pin 11c engages and receives the guide slot 12c, the inner cylinder 12 is precisely positioned in the outer cylinder 11 in the circumferential direction, so that the circumferential groove 13 of the inner cylinder 12 is brought in alignment with the guide bore 14 of the outer cylinder 11 as designed. In this state, the inner cylinder 12 is adjusted in axial position as appropriate by use of the position adjusting tool 19. For the axial position adjustment, the round shank 19b of the position adjusting tool 19 is inserted into the guide bore 14 until end pin 19a of the position adjusting tool 19 engages with and is received by the circumferential groove 13 of the inner cylinder 12. When turning the position adjusting tool 19 with the end pin 19a received in the circumferential groove 13, the inner cylinder 12 is moved back and forth in the axial direction without circumferentially turning. Then, assembling of the integrator unit 10 is completed by fastening set screws 18 (see FIG. 6) in the screw bores 11d so as thereby to fix the inner cylinder 12 to the outer cylinder 11. The integrator unit 10 is installed into the projector 2, and then the projector 2 is subjected to inspective operation.

Referring back to FIG. 2, the microcomputer 20 starts projection when receiving video signals through the video signal input means 69. Specifically, the microcomputer 20 causes the DMD driving means 62 to drive the DMD 26 according to the video signals, the color wheel drive means 61 to drive the color wheel 34 in predetermined timing with the start of projection, and the diaphragm driving means 63a and 63b through the diaphragm control means 64 to close down or open the variable diaphragms 43 and 44, respectively. A light beam from the light source unit 22 is separated into R, G and B light beams in time-sharing by the color wheel 24 and then travels toward the integrator unit 10. The rod integrator 36 causes total reflection of the incoming light beam by the by the internal reflective surfaces for homogenization of the luminous flux density of the incoming light beam. The homogenized light beam travels passing through the relay Lens 37, the variable diaphragm 43 and the relay lens 38 in this order reaches the total reflection prism assembly 23. Further, the light beam is reflected at the total reflection surface 24a of the triangular prism 24 and, then, reaches the DMD 26. In this instance, when the illumination optical system 20 has a right illumination angle, the light beam, neither too much nor too little, impinges the DMD 26 ranging over the whole area of the mirror surface and, in consequence, there are no problems with projection. However, if the illumination angle is too large to let the light beam cover the whole area of the mirror surface of the DMD 26, the light beam is wasted and loses its illumination intensity. On the other hand, if the illumination angle is too small to let the light beam to cover the whole area of the mirror surface of the DMD 26, the projector 2 projects a chipped image. The illumination angle of the illumination optical system 20 is adjusted by changing the rod integrator 36 in axial position.

The axial position adjustment of the rod integrator 36 is performed by seeing an image projected on the screen 4 as changing the inner cylinder 12 in axial position relative to the outer cylinder 11. More specifically, as shown in FIG. 4, the round shank 19b of the position adjusting tool 19 is inserted into the until the end pin 19a is received in the circumferential groove 13 of the inner cylinder 12. Because the end pin 19 is located on the end surface of the round shank 19b in an off center position, the inner cylinder 12 is moved back and forth in the axial direction following rotation of the position adjusting tool 19 as shown in FIGS. 7A to 7C.

Figure 7A:
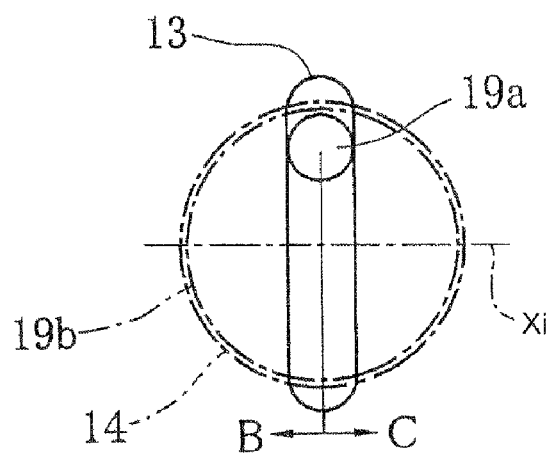
Figure 7B:
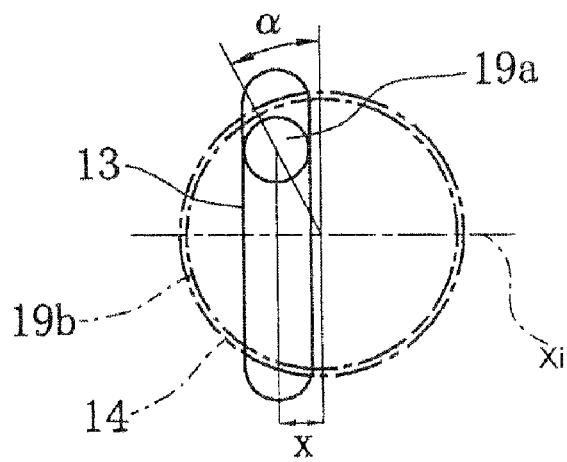
Figure 7C:
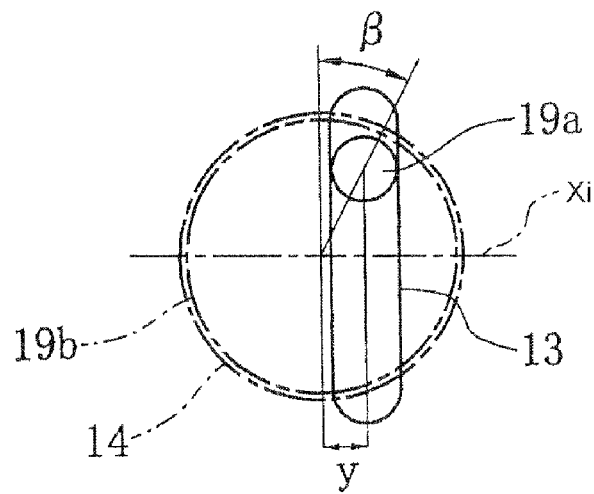

Referring to FIGS. 7A to 7C illustrating axial position adjustment of the rod integrator 36 through the axial position adjusting means, the end pin 19 of the position adjusting tool 19 is received in the circumferential groove 13 of the inner cylinder 12 as shown in FIG. 7A. When turning the position adjusting tool 19 in the counterclockwise direction by an angle α, the inner cylinder 12 is moved an axial distance x in an axial direction B in the cylinder bore of the outer cylinder 11 as shown in FIG. 7B. Similarly, when turning the position adjusting tool 19 in the clockwise direction by an angle β, the inner cylinder 12 is moved an axial distance y in an axial direction C in the cylinder bore of the outer cylinder 11 as shown in FIG. 7C. When the rod integrator 36 is positioned correctly so as to have an illumination angle suitable for providing illumination, neither too much nor too little, for the DMD 26, the inner cylinder 12 is fixedly secured to the outer cylinder 11 by fastening set screws in the screw bores 11d. The axial position adjusting means is not limited to the above demonstrative embodiment and may be modified by replacing the circumferential groove 13 and the end pin 19a with each other. More specifically, the axial position adjusting means may comprise a side pin radially-outwardly projecting from the inner cylinder 12 and an approximately straight slot formed in the end surface of the round shank 19b in an off center position from the rotational axis of the round shank 19a.

The rear projector for use with the integrator unit of the present invention is not limited to the type equipped with a single DMD as shown in the drawings and described in the specification and may be a type equipped with three DMDs for producing three primary color images, respectively, or otherwise, of a type having a liquid crystal display, reflective or transmissive.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An integrator unit for integrating an incoming light beam for a uniform distribution of illumination, said integrator unit comprising:

a rod integrator,
an inner cylinder for fixedly holding said rod integrator, and
an outer cylinder for receiving said inner cylinder coaxially therein for axial slide movement; and
further comprising engaging means provided on a cylinder shell wall of said inner cylinder and a radial access bore formed in a cylinder shell wall of said outer cylinder in which an axial position adjusting tool is fitted for rotation, said axial position adjusting tool having engaging means in a position off center from an axis of rotation of said axial position adjusting tool,
wherein, when said axial position adjusting tool is inserted in said radial access bore to bring said engaging means thereof into engagement with said engaging means of said inner cylinder and turned in said access, said inner cylinder is axially slid back and forth through said engagement.

2. The integrator unit as defined in claim 1, wherein said engaging means of said inner cylinder comprises a circumferential groove formed in a cylinder shell wall of said inner cylinder, and said engaging means of said axial position adjusting tool comprises an end projection secured to a round end face of said axial position adjusting tool.

3. The integrator unit as defined in claim 1, wherein said engaging means of said inner cylinder comprises a projection radially projecting from a cylinder shell wall of said inner cylinder, and said engaging means of said axial position adjusting tool comprises a straight groove formed in a round end face of said axial position adjusting tool in a position off center from a center of said round end face.

4. The integrator unit as defined in claim 1, and further comprising guide means for guiding said axial slide movement of said inner cylinder in said outer cylinder.

5. The integrator unit as defined in claim 4, wherein said guide means comprises an axial slot formed in either one of said inner and said outer cylinder and a radial projection projecting from the other of said inner and said outer cylinder.

6. A projector equipped with said integrator unit as defined in claim 1.

* * * * *